US008342259B2

(12) United States Patent
Ullrich et al.

(10) Patent No.: US 8,342,259 B2

(45) Date of Patent: Jan. 1, 2013

(54) TRANSMISSION DEVICE

(75) Inventors: Andre Ullrich, Filderstadt-Bernhausen (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/506,207

(22) Filed: Apr. 4, 2012

(65) Prior Publication Data

US 2012/0193116 A1 Aug. 2, 2012

Related U.S. Application Data

(63) Continuation of application No. 12/528,611, filed as application No. PCT/EP2008/051014 on Jan. 29, 2008, now Pat. No. 8,176,994.

(30) Foreign Application Priority Data

Mar. 2, 2007 (DE) ......................... 10 2007 010 179

(51) Int. Cl.

*B25F 5/00* (2006.01)
*F16H 1/00* (2006.01)
*F16H 1/06* (2006.01)
*B25D 16/00* (2006.01)

(52) U.S. Cl. .......... 173/104; 173/48; 173/109; 173/216; 173/217; 74/22 A; 74/63

(58) Field of Classification Search .................. 173/104, 173/48, 109, 216, 217; 74/22 A, 63
See application file for complete search history.

(56) References Cited

U.S. PATENT DOCUMENTS 6,460,627 B1 * 10/2002 Below et al. .................... 173/48
8,176,994 B2 * 5/2012 Ullrich et al. ................. 173/104

* cited by examiner

*Primary Examiner* — Brian D Nash
*Assistant Examiner* — Michelle Lopez
(74) *Attorney, Agent, or Firm* — Maginot, Moore & Beck

(57) ABSTRACT

The invention relates to a gearbox device, in particular, for a hammer drill or chisel, with a torque transmission mechanism, which has a first torque transmitting region for transmission of a torque to a first component and at least one second torque transmitting region for transmitting a torque to a second component. According to the invention, the first torque transmitting region and the second torque transmitting region at least partly have a corresponding partial contour for transmitting the torques.

18 Claims, 3 Drawing Sheets

TRANSMISSION DEVICE

CROSS-REFERENCE TO RELATED APPLICATION

This application is a continuation of U.S. application Ser. No. 12/528,611, now U.S. Pat. No. 8,176,994, filed Aug. 25, 2009 which was the National Stage of International Application PCT/EP2008/051014, filed on Jan. 29, 2008.

BACKGROUND OF THE INVENTION

1. Field of the Invention

The invention is based on a transmission device.

2. Description of the Prior Art

A transmission device is already known that has a torque transmission mechanism. The torque transmission mechanism includes a first torque transmission region for transmitting a torque with a first component and at least a second torque transmission region for transmitting a torque with a second component.

ADVANTAGES AND SUMMARY OF THE INVENTION

The invention is based on a transmission device, in particular for a rotary and/or chisel hammer, having a torque transmission mechanism, which has a first torque transmission region for transmitting a torque with a first component and at least one second torque transmission region for transmitting a torque with a second component.

It is proposed that the first torque transmission region and the second torque transmission region at least partially have a matching contour for transmitting the torques. In this connection, an "at least partially matching contour" should be understood to mean that the contours in at least one partial region have contour lines that coincide, and in particular have coinciding flank contour lines. As a result, the torque transmission mechanism can be produced especially economically and in a simple production process. The torque transmission mechanism, or the contour of the torque transmission mechanism, can be produced by way of punching, milling, pressing, and so forth. The transmission device of the invention can be used especially advantageously in conjunction with a rotary and/or chisel hammer, because of the different gear stages to be attained. In principle, however, the transmission device can be used with other power tools that appear useful to one skilled in the art as well, in particular hand-held power tools.

If the first torque transmission region and the second torque transmission region are disposed on a radially outward-oriented surface of the torque transmission mechanism, then the torque transmission mechanism can be supported especially advantageously inside the transmission device on a shaft, in particular rotatably on the shaft, for instance on an intermediate shaft of a rotary and/or chisel hammer.

It is also proposed that the first torque transmission region and the second torque transmission region have an identical cross-sectional face shape, as a result of which the two torque transmission regions can be formed or produced especially economically by means of one work step.

If the torque transmission mechanism has a continuous contour in the axial direction, then at least an enlarged torque transmission region can be attained, which by itself, or after a relative displacement of the torque transmission mechanism with regard to a component provided for transmitting torque, makes torque transmission with this component possible.

An especially advantageous spatial adaptation to various components for transmitting a torque can be attained if the first torque transmission region has a lesser addendum circle radius than an addendum circle radius of the second torque transmission region, with an identical root circle radius. Accordingly, an addendum circle diameter of the first torque transmission region is less than an addendum circle diameter of the second torque transmission region.

In an advantageous refinement of the invention, it is provided that the torque transmission mechanism has at least one partial region, which is located between the first torque transmission region and the second torque transmission region. As a result, the individual torque transmission regions can be restricted in at least one direction, so that by means of a displacement of the torque transmission mechanism relative to a component intended for a torque transmission, a torque transmission can be interrupted in a structurally simple way.

It is furthermore proposed that the partial region has a contour that differs from the first torque transmission region and from the second torque transmission region, as a result of which additional space can be created for at least one further component and/or at least one further function, such as a switch mechanism and/or a component provided for locking a chisel. Preferably, the partial region has a contour that is embodied in sleevelike fashion, and a radially outward-oriented surface of the partial region, at every point, has an identical spacing, in each case the shortest spacing, relative to a center axis of the torque transmission mechanism.

If the partial region has a radius that is reduced compared to the first torque transmission region and to the second torque transmission region, then the partial region can be produced especially economically by means of simply being twisted off.

In a further feature of the invention, it is proposed that the transmission device has the first component, which is formed by a sleeve and by means of which component a torque can be transmitted to the torque transmission mechanism, as a result of which a large transmission area between the first component and the torque transmission mechanism can be attained. Moreover, structurally simple switching of the torque transmission can advantageously be attained by means of an axial displacement of the sleeve.

It is furthermore proposed that the transmission device has the second component, which is formed by a gear wheel that is disposed in a manner fixed against relative rotation on a hammer barrel; as a result, direct transmission of a torque to a power takeoff mechanism can advantageously be attained with fewer additional components.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENTS

Figure 1:
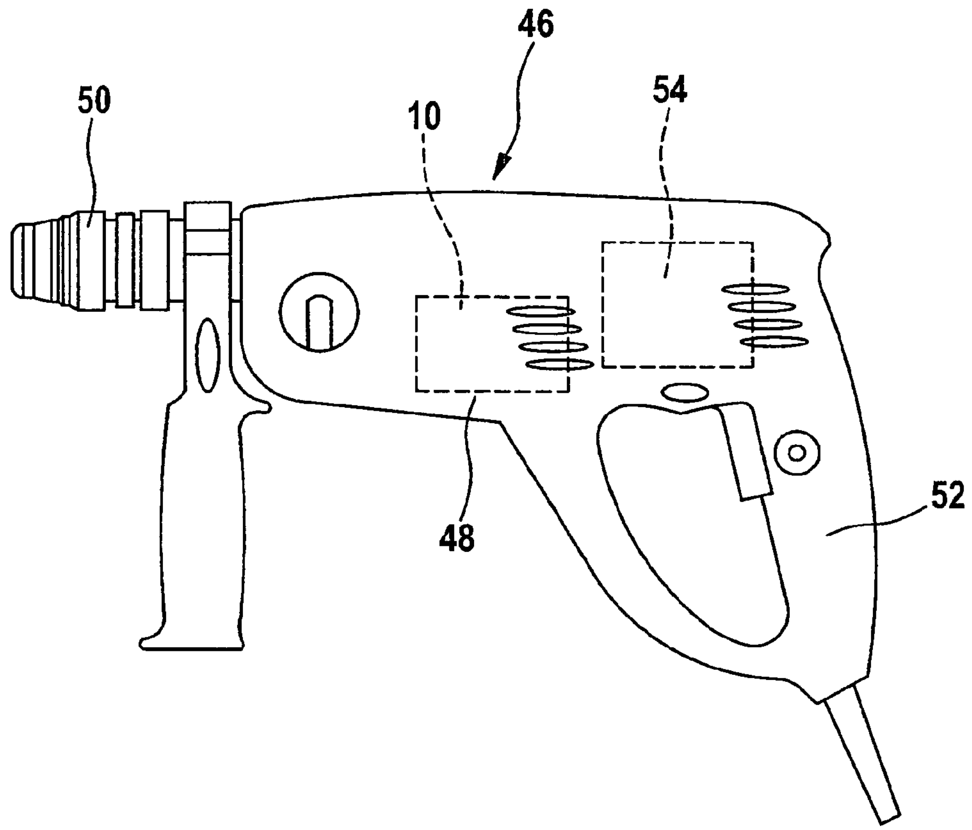
FIG. 1 shows a hand-held power tool having a transmission device according to the invention.

In FIG. 1, a hand-held power tool 46 formed by a rotary hammer is shown. The hand-held power tool 46 includes a housing 48 and a tool holder 50, in a front region, for receiving a tool. On a side facing away from the front region, the hand-held power tool 46 has a main handle 52 for actuating the hand-held power tool 46 and transmitting force from a user to the hand-held power tool 46.

For generating a driving torque, the hand-held power tool 46 has a drive unit 54, formed by an electric motor. The driving torque of the drive unit 54 is transmitted via a transmission device 10 of the hand-held power tool 46 to an impact mechanism 56, which for the sake of simplicity is shown only partially in FIG. 2, and/or to a rotating power takeoff mechanism 58 formed by a hammer barrel 44 (FIG. 2).

Figure 2:
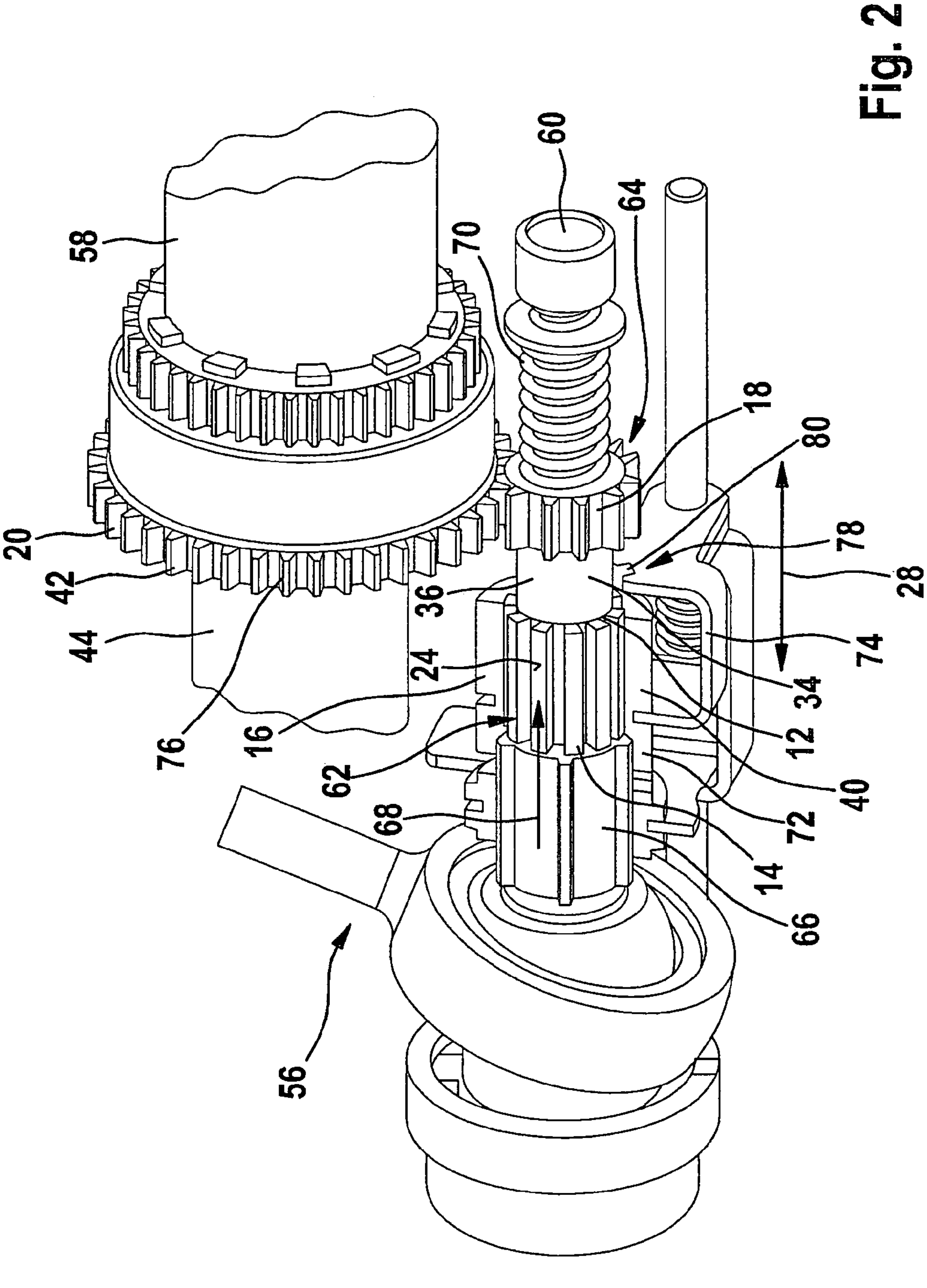
FIG. 2 shows the transmission device in a three-dimensional sectional view.
Figure 3:
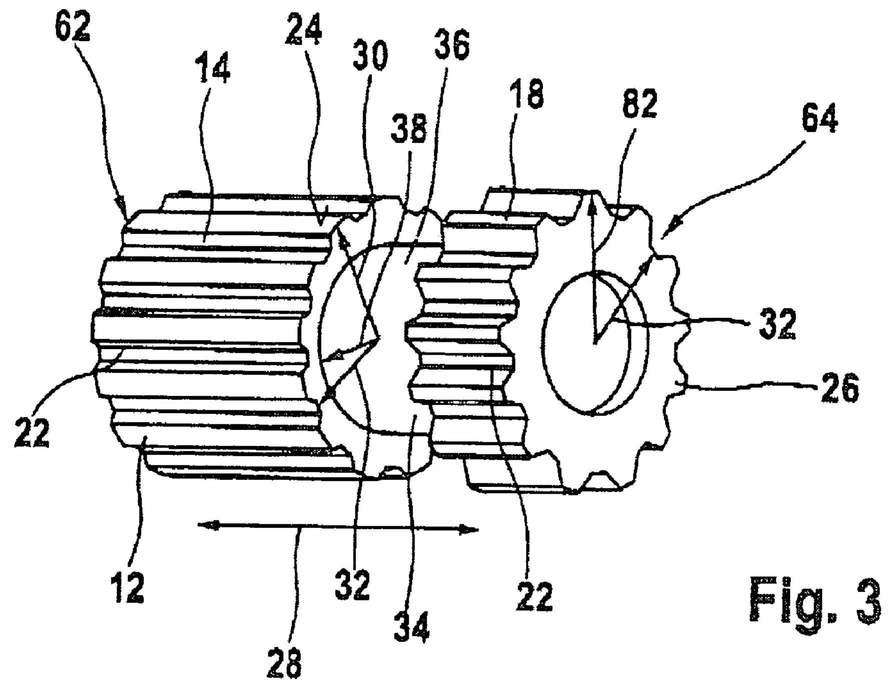
FIG. 3 shows a torque transmission mechanism from FIG. 2 in a three-dimensional sectional view.

The transmission device 10 includes an intermediate shaft 60 and a torque transmission mechanism 12 supported on the intermediate shaft 60 (FIG. 2). The torque transmission mechanism 12 has a first torque transmission region 14 and a second torque transmission region 18 for transmitting a torque with a first component 16 and a second component 20, respectively (FIGS. 2 and 3). The two torque transmission regions 14, 18 are disposed on a radially outward-oriented surface 24 of the torque transmission mechanism 12. The first torque transmission region 14 is disposed in an axial direction 28 of the torque transmission mechanism 12 on a drive-side end region 62 of the torque transmission mechanism 12, and the second torque transmission region 18 is disposed on an end region 64 of the power takeoff side of the torque transmission mechanism 12. The two torque transmission regions 14, 18 furthermore have a matching contour 22 for transmitting the respective torque, and the first torque transmission region 14 has a lesser addendum circle radius 30 than an addendum circle radius 82 of the second torque transmission region 18, for the same root circle radius 32 (FIG. 3).

Between the first torque transmission region 14 and the second torque transmission region 18, there is a further partial region 34 of the torque transmission mechanism 12, and this partial region is embodied in sleevelike fashion and has a smooth contour 36 without toothing. A radius 38 of the partial region 34 is shorter than'a root circle radius 32 of the first torque transmission region 14 and of the second torque transmission region 18 (FIGS. 2 and 3).

In operation of the transmission device 10 of the hand-held power tool 46, the torque transmission mechanism 12 can transmit torque from the intermediate shaft 60 to the hammer barrel 44. For that purpose, the intermediate shaft 60 is press-fitted onto a drive gearing 66 in a manner fixed against relative rotation. Along a force flow direction 68, the torque transmission mechanism 12 is disposed downstream of the drive gearing 66 on the intermediate shaft 60. Downstream of the torque transmission mechanism 12 in turn in the force flow direction 68, a spring 70 is disposed in prestressed fashion on the intermediate shaft 60. Because of a spring force of the spring 70, the torque transmission mechanism 12 is braced against the drive gearing 66 of the intermediate shaft 60 (FIG. 2).

To transmit torque from the intermediate shaft 60 or the drive gearing 66 of the intermediate shaft 60 to the torque transmission mechanism 12, a first component 16, which is formed by a sleeve 40, is supported displaceably in the axial direction 28 on the torque transmission mechanism 12. The sleeve 40 has an inner contour, not identified by reference numeral, that corresponds to the first torque transmission region 14, and on a drive-side end region 72, it has an inner contour corresponding to the drive gearing 66. By means of a switch mechanism 74, which is formed by a switch plate, the sleeve 40 is displaceable in the axial direction 28 on the torque transmission mechanism 12, so that in operation of the hand-held power tool 46, torque transmission from the intermediate shaft 60 to the hammer barrel 44 via the torque transmission mechanism 12 can be switched on and off by a user. In FIG. 2, a drive-side end position of the sleeve 40 is shown, which in operation of the hand-held power tool 46 enables a transmission of the driving torque from the intermediate shaft 60 to the torque transmission mechanism 12, via the drive gearing 66 and the sleeve 40. If the sleeve 40 is pushed by the switch mechanism 74 in the direction of the second torque transmission region 18, the inner toothing of the sleeve 40, corresponding to the drive gearing 66, is pushed out of the operative range of the drive gearing 66, and torque transmission between the intermediate shaft 60 and the torque transmission mechanism 12, or the drive gearing 66 and the sleeve 40, is interrupted.

The second torque transmission region 18 of the torque transmission mechanism 12 is provided for transmitting torque to the hammer barrel 44, in operation of the hand-held power tool 46. To that end, a second component 20, which is formed by a gear wheel 42, is disposed on the hammer barrel 44 in a manner fixed against relative rotation. This gear wheel 42 has a transmission contour 76 corresponding to the second torque transmission region 18. If the sleeve 40 is in the drive-side end position, then in operation of the hand-held power tool 46, the torque of the intermediate shaft 60 is transmitted to the torque transmission mechanism 12 via the drive gearing 66 and the sleeve 40 and from the torque transmission mechanism 12 to the hammer barrel 44 via the gear wheel (FIG. 2).

If in operation of the hand-held power tool 46 the sleeve 40 is in a position on the power takeoff side, torque transmission by means of the sleeve 40 to the torque transmission mechanism 12 is interrupted, and by means of the switch plate or a partial region 78, on the power takeoff side, of the switch plate, chisel locking is achieved. To that end, the partial region 78, on the power takeoff side, of the switch plate has a contour 80 corresponding to the second torque transmission region 18, which contour, in the position of the power takeoff side, meshes with the second torque transmission region 18 and thus prevents rotation of the torque transmission mechanism 12, hammer barrel 44, or a tool connected in a manner fixed against relative rotation to the hammer barrel 44. If the sleeve 40 is in the drive-side end position, a rotation of the torque transmission mechanism 12 relative to the partial region 78, on the power takeoff side, of the switch plate in operation of the hand-held power tool 46 is possible, because of the slight radius 38 of the partial region 34 of the torque transmission mechanism 12 compared to the second torque transmission region 18, so that locking between the partial region 34 and the switch plate is undone.

Figure 4:
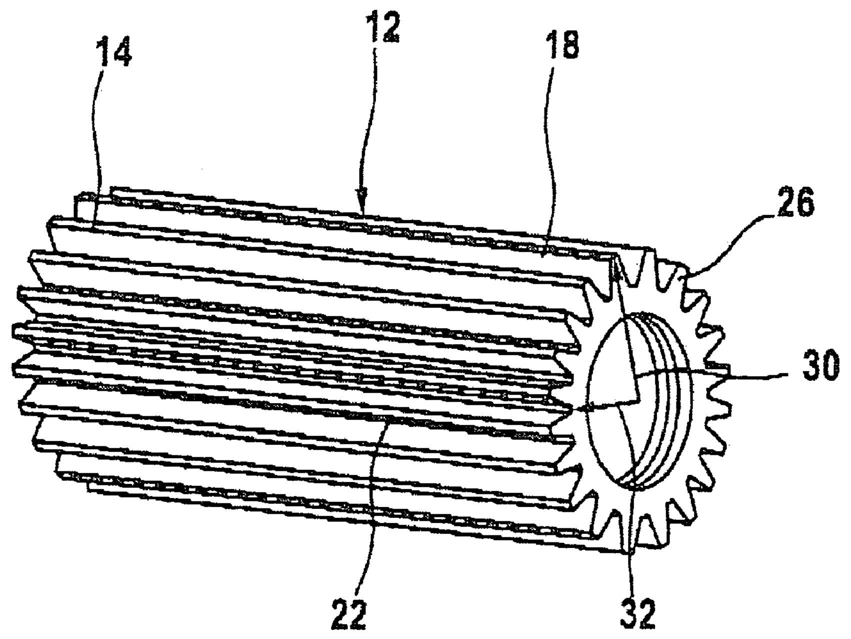
FIG. 4 shows an alternative torque transmission mechanism in a three-dimensional sectional view.

In FIG. 4, a torque transmission mechanism 12 of a transmission device 10 is shown that is an alternative to FIGS. 2 and 3. The description of this exemplary embodiment will be limited to differences from the exemplary embodiment shown in FIGS. 2 and 3. For characteristics that remain the same, the description of the exemplary embodiment in FIGS. 2 and 3 may be referred to.

Analogous characteristics of the various exemplary embodiments are identified by the same reference numerals.

A first torque transmission region 14 has an identical cross-sectional face shape 26 to a second torque transmission region 18 of the torque transmission mechanism 12. In addition, the torque transmission mechanism 12 has a continuous contour 22 with an addendum circle radius 30 that remains constant and a root circle radius 32 that remains constant (FIG. 4).

The foregoing relates to the preferred exemplary embodiments of the invention, it being understood that other variants and embodiments thereof are possible within the spirit and scope of the invention, the latter being defined by the appended claims.

What is claimed is:

1. A transmission device for a rotary and/or chisel hammer comprising: a torque transmission mechanism having a first torque transmission region for transmitting a torque with a first component and at least one second torque transmission region for transmitting a torque with a second component, wherein the first torque transmission region and the at least one second torque transmission region at least partially have a matching contour with coinciding flank contour lines for transmitting the torques, wherein the torque transmission mechanism surrounds an intermediate shaft of the rotary and/or chisel hammer and is rotatably supported on the intermediate shaft, and wherein the first torque transmission region and the at least one second torque transmission region are disposed on a radially outward-oriented surface of the torque transmission mechanism.

2. The transmission device as defined by claim 1, wherein the first torque transmission region and the at least one second torque transmission region have an identical cross-sectional face shape.

3. The transmission device as defined by claim 2, wherein the torque transmission mechanism has a continuous contour in an axial direction.

4. The transmission device as defined by claim 3, wherein the first torque transmission region has a lesser addendum circle radius than an addendum circle radius of the at least one second torque transmission region, and has an identical root circle radius.

5. The transmission device as defined by claim 4, wherein the torque transmission mechanism has at least one partial region, which is located between the first torque transmission region and the at least one second torque transmission region.

6. The transmission device as defined by claim 5, wherein the partial region has a contour that differs from the first torque transmission region and from the at least one second torque transmission region.

7. The transmission device as defined by claim 5, wherein the partial region has a radius that is reduced compared to the first torque transmission region and to the at least one second torque transmission region.

8. The transmission device as defined by claim 1, wherein the torque transmission mechanism has a continuous contour in an axial direction.

9. The transmission device as defined by claim 1, wherein the torque transmission mechanism has at least one partial region, which is located between the first torque transmission region and the at least one second torque transmission region.

10. The transmission device as defined by claim 9, wherein the partial region has a contour that differs from the first torque transmission region and from the at least one second torque transmission region.

11. The transmission device as defined by claim 9, wherein the partial region has a radius that is reduced compared to the first torque transmission region and to the at least one second torque transmission region.

12. The transmission device as defined by claim 1, wherein the first component is formed by a sleeve, by means of which a torque is transmitted to the torque transmission mechanism.

13. The transmission device as defined by claim 12, wherein the sleeve is supported displaceably in an axial direction on the torque transmission mechanism and switching of the torque transmission mechanism is attained by the axial displacement of the sleeve on the torque transmission mechanism by means of a switch mechanism.

14. The transmission device as defined by claim 1, wherein the second component is formed by a gear wheel that is disposed in a manner fixed against relative rotation on a hammer barrel.

15. A rotary and/or chisel hammer having a transmission device as defined by claim 1.

16. The transmission device as defined by claim 1, wherein a drive gearing is fitted onto the intermediate shaft in a manner fixed against relative rotation.

17. The transmission device as defined by claim 16, wherein the torque transmission mechanism rotatably supported on the intermediate shaft is disposed downstream of the drive gearing in a force flow direction.

18. The transmission device as defined by claim 17, wherein a spring is disposed on the intermediate shaft downstream of the torque transmission mechanism in the force flow direction for bracing the torque transmission mechanism against the drive gearing.

* * * * *